UNITED STATES PATENT OFFICE.

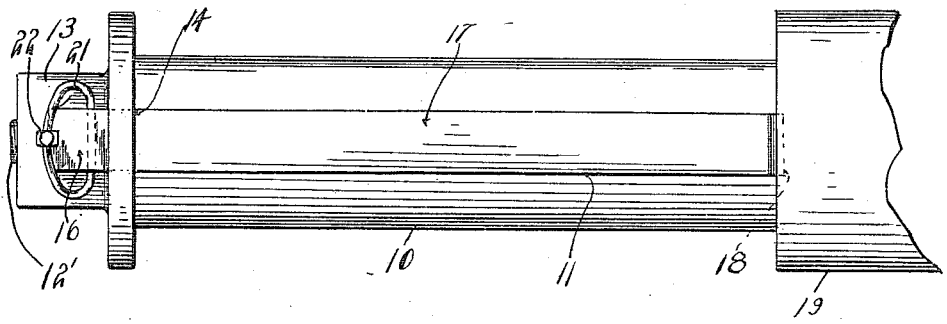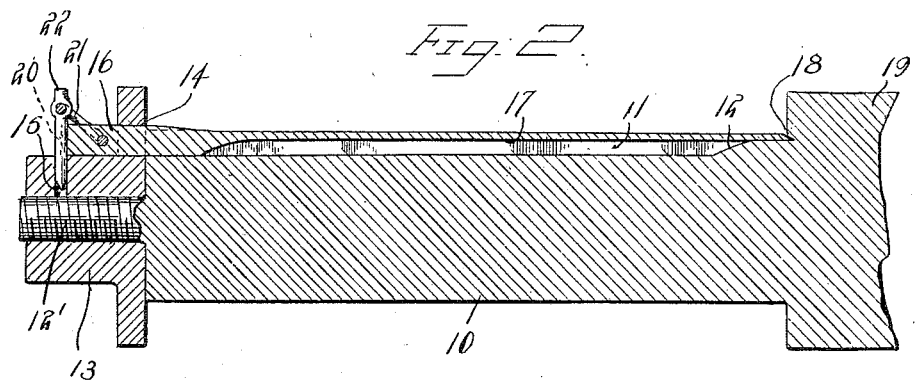

JAMES L. MASTERS, OF LITTLES, INDIANA.

AXLE-LUBRICATOR.

972,006.

Specification of Letters Patent.

Patented Oct. 4, 1910.

Application filed February 28, 1910. Serial No. 546,443.

*To all whom it may concern:*

Be it known that I, JAMES L. MASTERS, a citizen of the United States, residing at Littles, in the county of Pike, State of Indiana, have invented certain new and useful Improvements in Axle-Lubricators; and I do hereby declare the following to be a full, clear, and exact description of the invention, such as will enable others skilled in the art to which it appertains to make and use the same.

This invention relates to axle lubricators.

The object of the invention is to provide an improved construction by means of which the axle may be easily and quickly lubricated without removing the nut or the wheel from same and which will effectually lock the nut so that it cannot possibly work loose and off the axle.

With the above and other objects in view the invention consists in the details of construction and in the arrangement and combination of parts to be hereinafter more fully described and pointed out in the appended claims.

In describing the invention in detail reference will be had to the accompanying drawings wherein like characters of reference denote corresponding parts in the several views, and in which, Figure 1 is a plan view of a vehicle axle spindle embodying the construction contemplated by the present invention; Fig. 2, a vertical longitudinal section of the spindle and its associated parts as shown in Fig. 1. Fig. 3, an outer end view of what is shown in Fig. 1; and, Fig. 4, a detail view of the lubricating slide section.

Referring to the drawings, 10 indicates the axle spindle which has formed in its upper side a longitudinal groove 11, the inner end of which has formed therein a supporting step 12 for a purpose that will presently appear. The outer end of the spindle 10 is reduced and threaded as at 12′. for the reception of the axle nut 13 which latter is formed with the usual flange and head portions. The flange part of the nut 13 is provided with an aperture 14 so positioned that when said nut is completely screwed home for the purpose of securing a wheel upon the spindle 10 said aperture will aline with the groove 11. A recess 15 is formed in the head of the nut 13 just outward of the aperture 14 for a purpose to be presently described.

Disposed in the aperture 14 and the groove 11 is a slide section which is formed with an enlarged outer section 16 being substantially of the same cross section as the aperture 14, and a reduced inner portion 17 which is disposed in the groove 11. The inner end of the reduced portion of the slide section is supported upon the step 12 in order that same may be constantly held in spaced relation with respect to the base of the groove. The extreme inner end of the slide section projects in a recess 18 formed in the axle collar 19 whereby said slide section is more effectually held against possible lateral displacement. The outer end of the slide section is provided with a vertical groove 20, while a link 21 is swiveled to said slide section just inward of the outer end thereof. A pin 22 is pivotally mounted on said link and is adapted to be vertically disposed with its lower end seated in the recess 15 in the head of the nut and its body portion in the groove 20 on the end of the slide section, and when thus disposed said pin serves to lock the slide section against longitudinal displacement from the aperture 14.

In operation of the device the slide section is withdrawn and lubricant applied to the under face thereof. As the inner end of said section is of a thickness much less than the height of the aperture 14 it will be apparent that a considerable quantity of lubricant can be carried by said section through the aperture 14 into the groove 11, from whence it will gradually feed and effect the lubrication of the axle.

What is claimed is:

1. An axle lubricator comprising an axle spindle provided on its upper side with a longitudinal groove, an axle nut mounted on the outer end of said spindle provided with an aperture adapted for alinement with said groove in the locked position thereof, a slide disposed in said aperture and groove, said slide having its inner end reduced in thickness and said groove being provided with a supporting step in the inner end thereof for supporting the reduced portion of the slide in spaced relation to the base of the groove, and means for locking said slide against longitudinal displacement from the aperture and groove.

2. An axle lubricator comprising an axle spindle provided on its upper side with a longitudinal lubricant receiving groove, an axle nut mounted on the outer end of the spindle provided with an aperture adapted for alinement with said groove in the locked position thereof and with a recess in one of the side faces of its head, a slide disposed in the aperture of the nut and the groove of the spindle, a link swiveled to the outer end of said slide, and a pin pivoted to said link and adapted for engagement in the recess in the head of the nut to lock said slide against longitudinal displacement from said aperture and groove.

In testimony whereof, I affix my signature, in presence of two witnesses.

JAMES L. MASTERS.

Witnesses:
J. J. GLADISH,
PERRY WILLIS.